US011567579B2

(12) United States Patent
Doganis

(10) Patent No.: US 11,567,579 B2
(45) Date of Patent: Jan. 31, 2023

(54) SELECTION OF AN EDGE WITH AN IMMERSIVE GESTURE IN 3D MODELING

(71) Applicant: DASSAULT SYSTEMES, Vélizy-Villacoublay (FR)

(72) Inventor: Fivos Doganis, Vélizy-Villacoublay (FR)

(73) Assignee: DASSAULT SYSTEMES, Vélizy-Villacoublay (FR)

( * ) Notice: Subject to any disclaimer, the term of this patent is extended or adjusted under 35 U.S.C. 154(b) by 100 days.

(21) Appl. No.: 17/136,912

(22) Filed: Dec. 29, 2020

(65) Prior Publication Data

US 2021/0200324 A1 Jul. 1, 2021

(30) Foreign Application Priority Data

Dec. 30, 2019 (EP) .................................... 19306791

(51) Int. Cl.
*G06F 3/01* (2006.01)
*G06F 30/12* (2020.01)
*G06F 3/04815* (2022.01)
*G06F 3/04842* (2022.01)
*G06F 111/18* (2020.01)
*G06F 111/10* (2020.01)

(52) U.S. Cl.
CPC .......... *G06F 3/017* (2013.01); *G06F 3/04815* (2013.01); *G06F 3/04842* (2013.01); *G06F 30/12* (2020.01); *G06F 2111/10* (2020.01); *G06F 2111/18* (2020.01)

(58) Field of Classification Search
CPC .. G06F 3/017; G06F 3/04815; G06F 3/04842; G06F 30/12; G06F 2111/10; G06F 2111/18; G06F 3/011; G06F 30/10; G06F 3/0484; G06F 2203/04802
See application file for complete search history.

(56) References Cited

U.S. PATENT DOCUMENTS

| 9,070,402 | B2 | 6/2015 | Burtnyk |
| 11,175,749 | B2 | 11/2021 | Roziere |
| 2002/0056009 | A1 | 5/2002 | Affif |
| 2010/0234094 | A1* | 9/2010 | Gagner ............... G07F 17/3202 463/20 |

(Continued)

FOREIGN PATENT DOCUMENTS

| WO | 2017/218367 A1 | 12/2017 |
| WO | 2019/178114 A1 | 9/2019 |

OTHER PUBLICATIONS

Bruno R. De Araujo, et al., "Mockup Builder: Direct 3D Modeling on and Above the Surface in a Continuous Interaction Space", Graphics Interface Conference 11 , 2018 IEEE Conference on Virtual Reality and 3D User Interfaces (VR), IEEE, Mar. 18, 2018 (Mar. 18, 2018), pp. 320-326, XP033394602.

(Continued)

*Primary Examiner* — Andrey Belousov
(74) *Attorney, Agent, or Firm* — Oblon, McClelland, Maier & Neustadt, L.L.P.

(57) ABSTRACT

A computer-implemented method for selecting an edge among edges of a 3D object in a 3D immersive environment of a CAD system. Each edge is oriented in the 3D immersive environment. The method comprises displaying the 3D object in the 3D immersive environment, detecting a hand gesture including all fingers folded except thumb, determining an oriented line formed with the folded fingers of the hand in the 3D immersive environment, and identifying the edge of the 3D object having the closest orientation with the oriented line.

20 Claims, 7 Drawing Sheets

(56) References Cited

U.S. PATENT DOCUMENTS

| | | |
|---|---|---|
| 2013/0268893 A1 | 10/2013 | Maeda |
| 2015/0220149 A1 | 8/2015 | Plagemann |
| 2015/0234471 A1 | 8/2015 | Niinuma |
| 2019/0146599 A1* | 5/2019 | Gunnarsson ............ G06F 3/011 345/156 |
| 2019/0146660 A1 | 5/2019 | Holz et al. |

OTHER PUBLICATIONS

Bret Jackson, et al., "Yea Big, Yea High: A 3D User Interface for Surface Selection by Progressive Refinement in Virtual Environments", Department of Mathematics, Statistics, & Computer Science Macalester College, 2018 IEEE Conference on Virtual Reality and 3D User Interfaces, pp. 320 326.

Daniel Leithinger et al., "Direct and Gestural Interaction with Relief, Proceedings of the 24th Annual ACM Symposium on User Interface Software and Technology", : Oct. 16-19, 2011, Santa Barbara, CA, USA, ACM, New York, NY, Oct. 16, 2011 (Oct. 16, 2011), pp. 541-548, XP058006154.

Anonymous:, "Selecting—Blender Manual 11", web.archive.org, Nov. 22, 2019 (Nov. 22, 2019), XP055692231.

Rafael Radkowski et al.: "Interactive Hand Gesture-based Assembly for Augmented Reality Applications", Jan. 30, 2012 (Jan. 30, 2012), pp. 303-308, XP055234236, Retrieved from the Internet: URL:http://citeseerx.ist.psu.edu/viewdoc/download?doi=10.1.1.469.9714&rep=rep1&type=pdf [retrieved on Dec. 7, 2015].

European Search Report dated Jun. 19, 2020, corresponding to European application No. 19306790.7.

\* cited by examiner

SELECTION OF AN EDGE WITH AN IMMERSIVE GESTURE IN 3D MODELING

CROSS-REFERENCE TO RELATED APPLICATIONS

This application claims priority under 35 U.S.C. § 119 or 365 to European Application No. 19306791.5, filed Dec. 30, 2019. The entire contents of the above application(s) are incorporated herein by reference.

FIELD

The disclosure relates to the field of computer programs and systems, and more specifically to a method for selecting an edge among edges of a 3D object in a 3D immersive environment.

BACKGROUND

A number of systems and programs are offered on the market for the design, the engineering and the manufacturing of objects. CAD is an acronym for Computer-Aided Design, e.g. it relates to software solutions for designing an object. CAE is an acronym for Computer-Aided Engineering, e.g. it relates to software solutions for simulating the physical behaviour of a future product. CAM is an acronym for Computer-Aided Manufacturing, e.g. it relates to software solutions for defining manufacturing processes and operations. In such computer-aided design systems, the graphical user interface plays an important role in the efficiency of the technique. These techniques may be embedded within Product Lifecycle Management (PLM) systems. PLM refers to a business strategy that helps companies to share product data, apply common processes, and leverage corporate knowledge for the development of products from conception to the end of their life, across the concept of extended enterprise. The PLM solutions provided by Dassault Systèmes (under the trademarks CATIA, ENOVIA and DELMIA) provide an Engineering Hub, which organizes product engineering knowledge, a Manufacturing Hub, which manages manufacturing engineering knowledge, and an Enterprise Hub which enables enterprise integrations and connections into both the Engineering and Manufacturing Hubs. Altogether, the system delivers an open object model linking products, processes, resources to enable dynamic, knowledge-based product creation and decision support that drives optimized product definition, manufacturing preparation, production and service.

CAD applications allow creating accurate 3D objects interactively. A 3D object is considered as accurate when the 3D object reproduces faithfully a corresponding real object. One criterion is to minimize the differences between the envelopes of the 3D object and the real object. Therefore, 3D objects created with CAD applications traditionally contain many small topological elements for the rough parts of the 3D objects. Several approaches for selecting the topological elements of interest for the design have been implemented. Traditionally, mouse-based approaches are used.

Here a small topological element may be defined as an element with a small visible surface. In a mouse based approach, a small topological element may be defined as an element with a small clickable surface. In other words, a small topological element in a mouse based approach is difficult to select because users need to be really precise to define the mouse position. The topological elements may also often overlap and/or be partially or totally occluded. Therefore even if the topological elements are not small, their clickable surface with a mouse-based approach may be small or even zero.

In a 3D application, a well-known problem is the ambiguity about which element users want to select. In a CAD application, mouse-based approaches tend to select the smallest element pointed by the cursor but this does not solve the ambiguity completely. In order to reduce this ambiguity, a well-known solution is to let users specify which type of topological element they want to select. Using this information, the elements are filtered by type during selection. This solution is time consuming and needs to display the various filters available for example in a 2D panel. Another problem during selection of elements is to reduce the number of mandatory clicks needed to select one element. For example, it is often necessary to zoom in on the zone of interest to select the element of interest of a 3D object. Changing the point of view of the 3D scene is also necessary when the element of interest is occluded. These two cases need several actions from user and are time consuming.

Recently, hand interactions are gaining importance in 3D design applications. Indeed, recent advances in immersive technologies have made full hand tracking widely available, in Virtual Reality (VR), in Augmented Reality (AR) and in Mixed Reality (MR). Virtual Reality is a 3D immersive environment which may be defined as an artificial environment that is created with software and presented to the user in such a way that the user suspends belief and accepts it as a real environment. In Virtual Reality (VR), the users' perception of reality is completely based on virtual information. Augmented Reality (AR) and Mixed Reality (MR) differ from Virtual Reality (VR) in the sense that the 3D immersive environment is constituted by the surrounded environment which is actually real and by some layers of virtual objects added to the real environment. In Augmented Reality (AR) and Mixed Reality (MR), user is provided with additional computer generated information that enhances their perception of reality. On the other hand, in Virtual Reality (VR) the surrounding environment is completely virtual. A difference between Augmented Reality and Mixed Reality is that the user cannot interact directly with virtual objects in Augmented Reality (AR). In Mixed Reality, the additional computer generated information are "mixed" together to create a realistic environment. A user may navigate this environment and interact with both real and virtual objects.

For example, Augmented Reality (AR) has the capability to display a virtual 3D box on a physical table. With Mixed Reality (MR), the user might be able to pick up and open the box.

In the definitions of Virtual, Augmented and Mixed Reality, a real object is an object which exists physically in the environment world.

None of the existing CAD applications allows the creation of accurate 3D objects, in an immersive environment, using natural hand interactions.

Within this context, there is still a need for an improved method for selecting by use of hand gestures topological elements such as edges of a 3D object in a 3D immersive environment of a CAD system.

SUMMARY

It is therefore provided a computer-implemented method for selecting an edge among edges of a 3D object in a 3D immersive environment of a CAD system. Each edge is oriented in the 3D immersive environment. The method comprises:

displaying the 3D object in the 3D immersive environment;

detecting a hand gesture comprising all fingers folded except thumb;

determining an oriented line formed with the folded fingers of the hand in the 3D immersive environment; and identifying the edge of the 3D object having the closest orientation with the oriented line.

The method may comprise one or more of the following:

each edge of the 3D object and the oriented line further have a direction and wherein the identifying further comprises identifying the face of the 3D object having a closest direction between the direction of said edge and the direction of the oriented line;

before the identifying, determining an oriented plane formed with the palm or the back of the hand in the 3D immersive environment, the oriented plane comprising a normal, wherein each edge of the 3D object and the oriented line further have a position in the 3D immersive environment, and wherein the identifying further comprises:

minimizing a function $f$:

$$f(\text{Edge}) = w_1 * \|FH\| + w_2 * \widehat{FH}$$

wherein:

Edge is the edge of interest;

$\{w_1 \in \mathbb{R} \mid w_1 \geq 0\}$ and $\{w_2 \in \mathbb{R} \mid w_2 \geq 0\}$ and $\{w_1 + w_2 > 0\}$;

$\|FH\|$ is an Euclidian distance in the 3D immersive environment between the position of the edge Edge and the position H of the oriented plane of the hand; and $\widehat{FH}$ is an angle in the 3D immersive environment between the direction of the edge Edge and direction of the oriented line formed with the folded fingers of the hand.

the term $\|FH\|$ of the function $f$ is replaced by $\|FH'\|$ with H' being computed by:

$$H' = E + EH * \max(1, a*(\|EO_{max}\|)/\|EH_{max}\|)$$

wherein:

H' is the position of the oriented plane of a virtual hand;

E is the position of the user's point of view;

H is the position of the oriented plane of the user's hand;

EH is a vector from E to H;

O max is the position of the furthest edge of the 3D object from E;

H max is the furthest position of the center of the user's hand from E in a transverse plane of the user's body;

$\{a \in \mathbb{R} *\}$;

$\|EO_{max}\|$ is the norm of the vector from E to O max; and $\|EH_{max}\|$ is the norm of the vector from E to H max;

the term $\|FH\|$ of the function $f$ further comprises the Euclidean distance in the 3D immersive environment between the position of the edge and at least one intersection of the 3D model with a ray being cast from the center of the head or the dominant eye or the point between the eyes to the center of the 3D model;

the identifying comprises:

determining the edge of the 3D object having the closest orientation with the oriented line;

computing one or more n-neighbouring edges of the determined edge, the one or more neighbor edges and the determined edge forming a subset of selectable edges; and identifying the edge of the 3D object having the closest orientation with the oriented line from the subset of selectable edges;

modifying a first rendering of the edges of subset of selectable edges;

modifying a second rendering of the identified edge;

the edges of the 3D objects are edges that are part of at least one selected among triangles and/or quadrangles and/or topological faces and/or parametric surfaces and/or procedural surfaces;

detecting the hand gesture comprises a folding of all fingers except thumb and an abduction of the thumb;

selecting the identified edge of the 3D object by detecting that the hand gesture further comprises an adduction of the thumb;

detecting that the hand gesture further comprises an unfolding of all fingers except thumb, and deselecting the selected edge;

detecting the hand gesture further comprises detecting that the distal phalanges of index finger, middle finger, ring finger and little finger are substantially in contact with the palm of the hand.

It is further provided a computer program comprising instructions for performing the method.

It is further provided a system comprising a display and a processing circuitry communicatively coupled with memory, the memory storing the computer program.

It is further provided a computer-readable medium storing the computer program.

BRIEF DESCRIPTION OF THE DRAWINGS

Embodiments will now be described, by way of non-limiting example, and in reference to the accompanying drawings, where.

DETAILED DESCRIPTION

Figure 1:
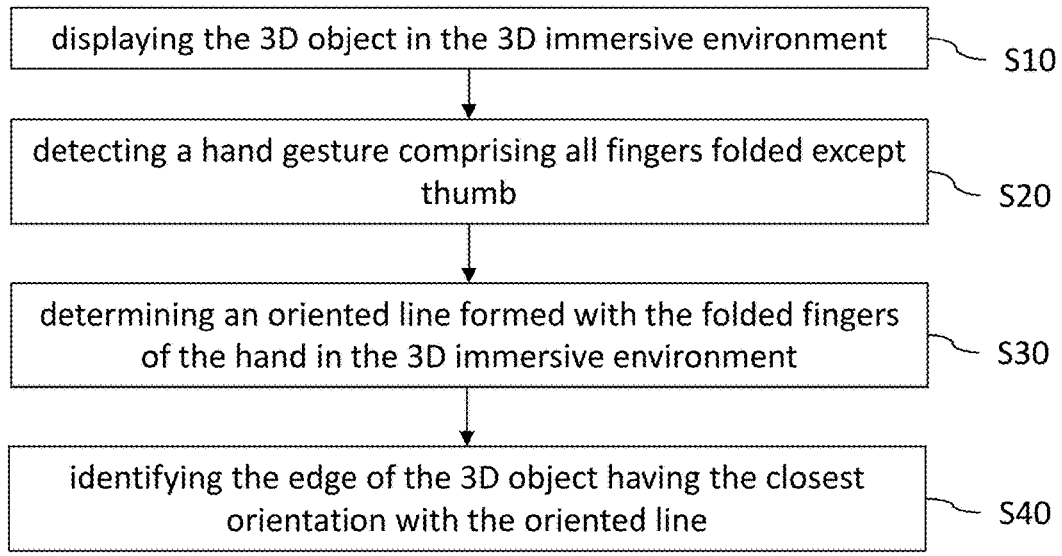
FIG. 1 shows an example of a flowchart of the method.

With reference to the flowchart of FIG. 1, it is proposed a computer-implemented method for selecting an edge among edges of a 3D object in a 3D immersive environment of a CAD system. Each edge is oriented in the 3D immersive environment. The method comprises displaying the 3D object in the 3D immersive environment. The method further comprises detecting a hand gesture. The hand gesture comprises all fingers folded except thumb. The method further comprises determining an oriented line formed with the folded fingers of the hand in the 3D immersive environment. The method further comprises identifying the edge of the 3D object having the closest orientation with the oriented line.

This constitutes an improved method for selecting an edge among edges of a 3D object in a 3D immersive environment of a CAD system using hand interactions. Notably, the method solves the problem of the ambiguity about which element users want to select. As explained above, in CAD applications, 3D objects contain many small elements. Selecting an element might be difficult with a mouse based approach because of the size of the element or of the size of the visible surface of the element from the user's point of view. Indeed, if the size is small, with a mouse-based approach a user needs either to move their mouse really precisely and/or to zoom-in and/or to change the point of view of the 3D scene. The method presented here solves this drawback. Indeed, the method is using the orientation of the line (a virtual one) formed with the folded fingers of the hand during a hand gesture to determine which element the user wants to select. The method may also combine the orientation of the line formed with the folded fingers of the hand with the position of the hand during the hand gesture of the user to determine which element the user wants to select. By using a combination of a position and an orientation, all elements of a 3D object may be differentiated and therefore selected by the user with the method.

The method is computer-implemented. This means that steps (or substantially all the steps) of the method are executed by at least one computer, or any system alike. Thus, steps of the method are performed by the computer, possibly fully automatically, or, semi-automatically. In examples, the triggering of at least some of the steps of the method may be performed through user-computer interaction. The level of user-computer interaction required may depend on the level of automatism foreseen and put in balance with the need to implement user's wishes. In examples, this level may be user-defined and/or pre-defined.

For example, the detecting S20 and the determining S30 partially depend on a user action. The detecting S20 is performed as a result of a user action that comprises a user hand gesture with a folding of all fingers except thumb. The determining S30 is performed as a result of a user action that comprises a user hand gesture where an oriented line is formed with or from the folded fingers (except thumb) of the user's hand.

A typical example of computer-implementation of a method is to perform the method with a system adapted for this purpose. The system may comprise a processor coupled to a memory and a graphical user interface (GUI), the memory having recorded thereon a computer program comprising instructions for performing the method. The memory may also store a database. The memory is any hardware adapted for such storage, possibly comprising several physical distinct parts (e.g. one for the program, and possibly one for the database).

Figure 3:
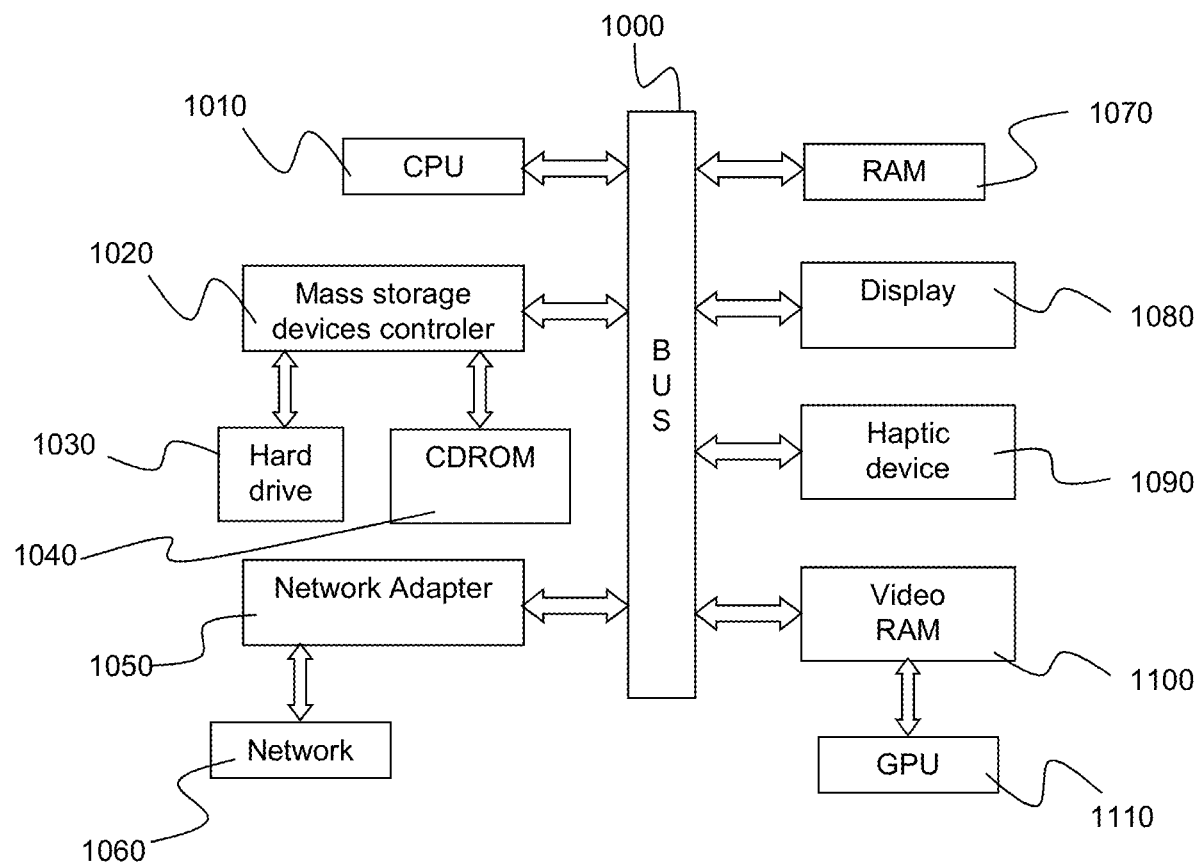
FIG. 3 shows an example of the system.

FIG. 3 shows an example of the system, wherein the system is a client computer system, e.g. a workstation of a user.

The client computer of the example comprises a central processing unit (CPU) 1010 connected to an internal communication BUS 1000, a random access memory (RAM) 1070 also connected to the BUS. The client computer is further provided with a graphical processing unit (GPU) 1110 which is associated with a video random access memory 1100 connected to the BUS. Video RAM 1100 is also known in the art as frame buffer. A mass storage device controller 1020 manages accesses to a mass memory device, such as hard drive 1030. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 1040. Any of the foregoing may be supplemented by, or incorporated in, specially designed ASICs (application-specific integrated circuits). A network adapter 1050 manages accesses to a network 1060. The client computer may also include a haptic device 1090 such as cursor control device, a keyboard or the like. A cursor control device is used in the client computer to permit the user to selectively position a cursor at any desired location on display 1080. In addition, the cursor control device allows the user to select various commands, and input control signals. The cursor control device includes a number of signal generation devices for input control signals to system. Typically, a cursor control device may be a mouse, the button of the mouse being used to generate the signals. Alternatively or additionally, the client computer system may comprise a sensitive pad, and/or a sensitive screen.

The computer program may comprise instructions executable by a computer, the instructions comprising means for causing the above system to perform the method. The program may be recordable on any data storage medium, including the memory of the system. The program may for example be implemented in digital electronic circuitry, or in computer hardware, firmware, software, or in combinations of them. The program may be implemented as an apparatus, for example a product tangibly embodied in a machine-readable storage device for execution by a programmable processor. Method steps may be performed by a programmable processor executing a program of instructions to perform functions of the method by operating on input data and generating output. The processor may thus be programmable and coupled to receive data and instructions from, and to transmit data and instructions to, a data storage system, at least one input device, and at least one output device. The application program may be implemented in a high-level procedural or object-oriented programming language, or in assembly or machine language if desired. In any case, the language may be a compiled or interpreted language. The program may be a full installation program or an update program. Application of the program on the system results in any case in instructions for performing the method.

The method manipulates 3D objects. Hereafter, any reference to a 3D object will refer to a digitally modeled 3D object, and not to a physical one. A digitally modeled 3D object may represent the geometry of a product to be manufactured in the real world subsequent to the completion of its virtual design with for instance a CAD software solution or CAD system, such as a (e.g. mechanical) part or assembly of parts (or equivalently an assembly of parts, as the assembly of parts may be seen as a part itself from the point of view of the method, or the method may be applied independently to each part of the assembly), or more generally any rigid body assembly (e.g. a mobile mechanism). A CAD software solution allows the design of products in various and unlimited industrial fields, including: aerospace, architecture, construction, consumer goods, high-tech devices, industrial equipment, transportation, marine, and/or offshore oil/gas production or transportation. A 3D modeled object herein may thus represent an industrial product which may be any mechanical part, such as a part of a terrestrial vehicle (including e.g. car and light truck equipment, racing cars, motorcycles, truck and motor equipment, trucks and buses, trains), a part of an aerial vehicle (including e.g. airframe equipment, aerospace equipment, propulsion equipment, defense products, airline equipment, space equipment), a part of a naval vehicle (including e.g. navy equipment, commercial ships, offshore equipment, yachts and workboats, marine equipment), a general mechanical part (including e.g. industrial manufacturing machinery, heavy mobile machinery or equipment, installed equipment, industrial equipment product, fabricated metal product, tire manufacturing product), an electro-mechanical or electronic part (including e.g. consumer electronics, security and/or control and/or instrumentation products, computing and communication equipment, semiconductors, medical devices and equipment), a consumer good (including e.g. furniture, home and garden products, leisure goods, fashion products, hard goods retailers' products, soft goods retailers' products), a packaging (including e.g. food and beverage and tobacco, beauty and personal care, household product packaging).

A 3D object may be composed of at least one the following three types of topological entities: face, edge, and vertex. By definition, a face is a bounded portion of a surface. An edge is a bounded portion of a curve. A vertex is a point in 3D space. They are related to each other's as follows. The bounded portion of a curve is defined by two points (the vertices) lying on the curve. The bounded portion of a surface is defined by its boundary, this boundary being a set of edges lying on the surface. Edges of the face's boundary are connected by sharing vertices. Faces are connected by sharing edges. Two faces are adjacent if they share an edge. Similarly, two edges are adjacent if they share a vertex. All edges of a face may be lying on a same plane or not. A normal of a face may be calculated by taking the vector cross product of two edges of that face. If not all edges of a face are lying on a same plane, it is worth noting that various normal may be computed depending on the edges chosen to calculate the cross product. The normal may also be edited. The normal gives the direction of the plane. The orientation of the plane may be deducted from the direction of the plane. The orientation of the said plane is materialized by a line parallel to its normal. The orientation of this line of the plane may also be edited. A plane has also a position. The position of a face may be given by its centroid. The position of a face may also be edited. The edges of a 3D model are oriented. The orientation of an edge may be deduced from the orientation of the faces it belongs to. For instance in the case of a Boundary Representation (also referred to as B-Rep), the consistency between the normal of a face of the B-Rep and the edges that belong to the face may be used for the determination of the edges orientation (e.g. clockwise rule, counter clockwise). In practice, an edge belongs to two faces of a mesh comprising triangles and/or quadrangles. The direction of an edge may be arbitrarily determined, e.g. it may be edited by the user. As mentioned previously, the normal of a plane may be computed from a vector cross product of two edges of a face; the edges are thus oriented.

From now on, we assume all orientations, directions and positions are computed in the 3D immersive environment's reference frame.

The 3D object may also be defined using edges or lines, in certain cases (that is, optionally) with faces or surfaces. For instance, the 3D object may be computed from a cloud of points obtained from a laser scan of a mock-up. Such a cloud of points is typically made of disconnected vertices, but may also comprise interconnected edges that represent the shape of digitalized mock-up.

The 3D object may be a wireframe 3D object. The wireframe may be obtained from a cloud of points, or designed by a user.

Lines, edges, or surfaces may be represented in various manners, e.g. non-uniform rational B-splines (NURBS). These edges, lines, and/or surfaces may be used as inputs from which a geometry of the 3D object may be generated, which in turn allows for a representation of the 3D object to be generated. The method described here may be used on 3D object based on non-uniform rational B-splines (NURBS) lines, edges and surfaces. More generally, surfaces may also be parametric and/or procedural surfaces. A parametric surface is a surface in the Euclidean space $\mathbb{R}^3$ which is defined by a parametric equation with two parameters $\vec{r}$: $\mathbb{R}^2 \to \mathbb{R}^3$. A procedural surface is a surface which is defined as a procedure. A subdivision surface may be considered as a procedural surface. A subdivision surface is a method of representing a smooth surface via the specification of a coarser piecewise linear polygon mesh.

Referring now to FIG. 1, the method displays S10 at least one 3D object in a 3D immersive environment. If there is more than one 3D object displayed in the 3D immersive environment, there is one 3D object identified as a 3D object of interest. From now on, the 3D object of interest is referred to as the 3D object.

As defined above, a 3D immersive environment may be used in Virtual, Augmented or Mixed Reality. This 3D immersive environment has a reference frame. All objects, and all their topological elements, in this 3D immersive environment may therefore be located relatively to this reference frame. The method may then be used in Virtual, Augmented and Mixed Reality to select a face of any of the 3D object of a 3D immersive environment. The method could also be used in any other Reality comprising an environment with a reference frame allowing the localization of at least one 3D object.

Then, a hand gesture is detected S20. The hand gesture comprises a folding of all fingers except thumb.

The user's interactions with the 3D immersive environment may be done by tracking a position and an orientation of a part of the body of the user, or by tracking respective positions and orientations of several parts of the user's body, or even tracking positions and orientations of the complete user's body.

In examples, parts of the user's body are the hand(s) of the user.

Hand tracking provides direct and natural interactions and improves the immersive experience. Indeed the user does not need to use specific Virtual, Mixed or Augmented Reality hand controllers. Traditionally, to interact with a 3D object in a 3D immersive environment, a method comprises clicking on a button of the specific controller after pointing at the 3D object with a virtual 3D line.

Figure 6:
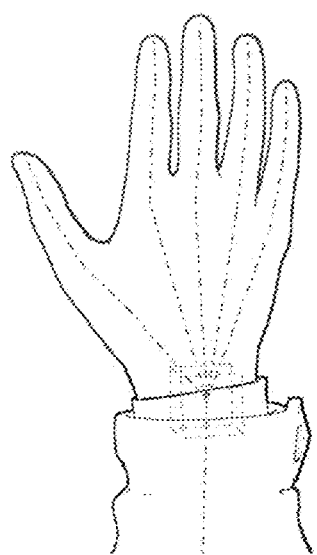
FIG. 6 shows an example of default gesture.

Hand tracking allows a detection of specific postures or gestures of a hand. For example, hand tracking of specific postures may be done with a video recorder or with gloves and hand tracking of specific gestures may be done with accelerometers. The method may be used with the right or the left hand of the user. A posture is a pose using a part of the body and a gesture here may be defined as a movement allowing a part to modify its posture. In other words, a second posture may be seen as the result of a gesture started from a first posture. Therefore detecting a gesture may be done by detecting a second posture and comparing this second posture with a first posture. If the detected second posture is the same than the first posture, no gesture happened. If the detected posture is different from the first posture, the gesture may be defined as the difference between the second posture and the first posture. More generally, a gesture may be defined as a change of posture triggered by a change of position and/or orientation of a part of the user's body, e.g. the user's hand. For example, in the method, detecting a hand gesture could consist of computing a difference of the current posture from the default posture. In this example, the default posture corresponds to the first posture and the current posture to the second posture the difference may be inferred with a change of position and/or orientation of the user's hand. It is worth noting that hand tracking of specific postures is performed with devices capturing a posture at a high framerate, for example at least 10 frames per second, therefore the risk of not detecting a motion involving a motion from a first posture to a first posture with an intermediate second posture is really low. The default posture could be any posture allowing the detection of all finger folded except the thumb. An example of a default posture for a right hand is shown in FIG. 6. This default posture is an example of a common posture for a resting right hand. In other words, the default posture is an example of a posture for a right hand in which all muscles are relaxed. A default posture could also be defined as any posture, which will not be detected as a specific posture used in any step of the method. From now on, for the sake of explanation only, all gestures will be defined as a difference of the default posture shown in FIG. 6.

The detection of a gesture may be done in various ways. In an example, gestures may be detected by mathematical comparison of the relative positions and/or orientations of various parts of the body, with some tolerance to take into account morphological variations. Note that a calibration phase might be required for the system to adjust to the morphology of the user. In another example, gestures may also be detected using machine learning techniques, by training a neural network to distinguish the different possible gestures.

In examples, kinematic parameters of the gesture of the hand may be provided through a virtual skeleton as shown for example in FIG. 6. A virtual skeleton comprises one or more joints and one or more bones. This virtual skeleton does not need to replicate a real skeleton. In other words, there might be no correspondence between the joints and the bones of the virtual skeleton with the joints and the bones of the real skeleton. For example, the virtual skeleton of a hand might have less or more joints than the real skeleton of a hand. Furthermore, even if each joint of the virtual skeleton corresponds to a joint of the real skeleton, their position and orientation might vary. By using the linear and angular speed, position and orientation of the joints of the virtual skeleton, it is possible to detect a gesture or a posture of the real skeleton. For the sake of simplicity, in the later we will consider that the virtual skeleton replicates the real skeleton of the hand.

It is worth noting that the method of the disclosure is independent to the detecting method used to detect the various postures described. Hence, any technology able to detect a change of posture (e.g. a change of position and/or orientation of a part of the user's body), based or not on a virtual skeleton, may be used.

Figure 4:
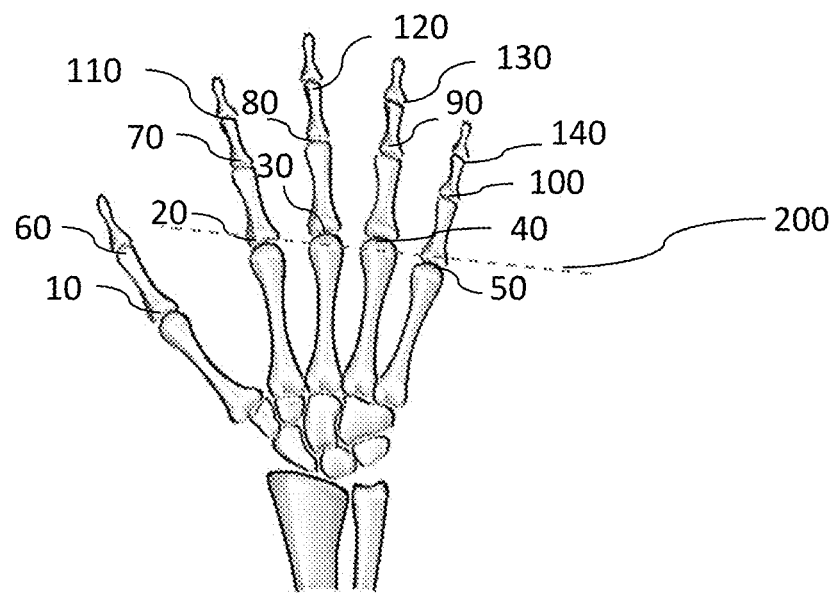
FIG. 4 shows an example of a posteroanterior view of a skeleton of a right hand in a default posture.

An example of real skeleton of a hand is shown in FIG. 4. A hand contains five fingers, which are traditionally called: thumb, index finger, middle finger, ring finger and little finger. The thumb is composed of the metacarpophalangeal 10 and interphalangeal 60 joints. The index finger is composed of the metacarpophalangeal 20, proximal interphalangeal 70 and distal interphalangeal 110 joints. The middle finger is composed of the metacarpophalangeal 30, proximal interphalangeal 80 and distal interphalangeal 120 joints. The ring finger is composed of the metacarpophalangeal 40, proximal interphalangeal 90 and distal interphalangeal 130 joints. The little finger is composed of the metacarpophalangeal 50, proximal interphalangeal 100 and distal interphalangeal 140 joints. The rest of the hand may be divided in three areas. A first area is the palm, which is the central region of the anterior part of the hand. A second area is the back of the hand, which is the corresponding area of the palm on the posterior part of the hand. A third area is the heel of the hand located in the proximal part of the palm.

Figure 5:
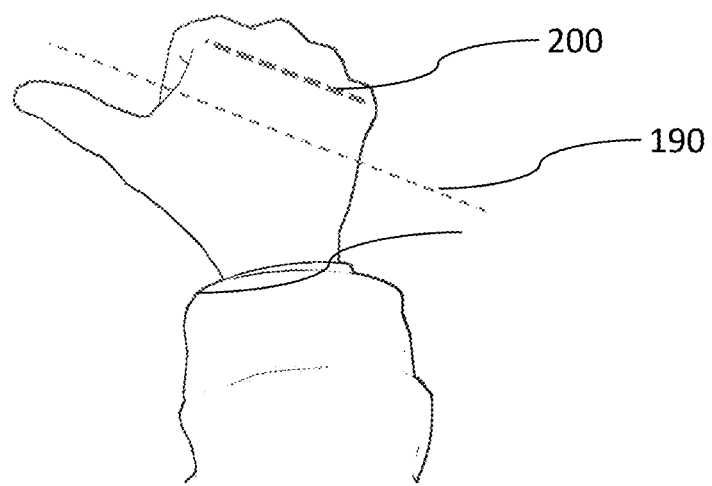
FIG. 5 shows an example of the detected gesture.

Folding all fingers is the gesture of curling up the fingers of a hand. As shown in the example of FIG. 5, for fingers except thumb, folding is the gesture moving each of the fingers toward a line 190. As an example shown in FIG. 5, this line 190 may be defined by the center of the palm of the hand. The folding of all fingers except thumb is a folding of the metacarpophalangeal joints 20, 30, 40, 50 of respectively index finger, middle finger, ring finger and little finger, proximal interphalangeal joints 70, 80, 90, 100 and distal interphalangeal 110, 120, 130, 140 of respectively index finger, middle finger, ring finger and little finger. This gesture is the result of a contraction of muscles of the finger, and it may include the muscles known as flexor digitorum profundus and flexor digitorum superficialis. This gesture leads the tips of the index finger, middle finger, ring finger and little finger to be in contact with, close to the palm of the hand.

Adduction of the thumb is the gesture bringing the thumb towards the palm of the hand. Adduction of the thumb is mainly produced by the adductor pollicis. Adduction of the thumb may also bring the thumb towards the side of the palm and index finger. Abduction of the thumb is the gesture bringing the thumb away from the palm of the hand. Abduction of the thumb may also bring the thumb away from the side of the palm of the hand and index finger. Adduction of the thumb is partly produced by the abductor pollicis longus. Adduction and abduction of the thumb involve metacarpophalangeal joint 10 of thumb. Flexion of the thumb moves the thumb towards the line 190. Flexion of the thumb is mainly produced by flexor pollicis brevis muscle. Extension moves the thumb away from the line 190. Extension of the thumb is mainly produced by extensor pollicis longus muscle. Adduction, abduction, flexion and extension of the thumb involve metacarpophalangeal joint 10 of thumb.

Referring back to FIG. 1, after detecting S20 a hand gesture comprising all fingers folded except thumb, the method comprises determining S30 an oriented line formed with the folded fingers of the hand in the 3D immersive environment. Determining S30 an oriented line formed with the folded fingers of the hand can based on evaluating the orientation of the proximal phalanges of the hand, except thumb. The proximal phalanges of the fingers may be considered as forming a line when all fingers except thumb are folded. Therefore, it is possible to consider the proximal phalanges of the hand as a line when all fingers except thumb are folded. In order to approximate the orientation of the line formed with the folded fingers except thumb, one point may be determined on each proximal phalanges and a straight position passing through each point may be computed, e.g. by using average positions of these points. Alternatively, the determining S30 an oriented line formed with the folded fingers of the hand can be based on evaluating a virtual line passing through the cavity that is formed by the folded fingers (except thumb) and the palm of the hand. This cavity has roughly the shape of a cylinder. The virtual line may be obtained by computing a center of this cylinder formed by the folded fingers (excepted thumb). Alternatively, the determining S30 formed with the folded fingers of the hand can be based by determining a line passing through the metacarpophalangeal joints 20, 30, 40, 50 of respectively index finger, middle finger, ring finger and little finger when the fingers are in folded position. FIG. 4 illustrates the alignment 200 of the metacarpophalangeal joints 20, 30, 40, 50. The metacarpophalangeal joints are naturally aligned, thus making easier the computation of a line from these joints compared to the other joints of the hand.

In the discussion hereinabove, the orientation of the proximal phalanges is exploited. Indeed, these phalanges have less degrees of freedom and are therefore involved in less inter-individual variabilities. In other words, the detection of the proximal phalanges is more robust. It is to be understood that the distal phalanges might be used instead of the proximal phalanges, or in combination with the proximal phalanges.

Determining S30 may be done by using a virtual skeleton. Determining S30 may also be done without any virtual skeleton. As an example, determining S30 may be based on a neural network trained to determine S30 from a video recorder.

Using the folded fingers of the hand to allow the users to provide an oriented line to the system makes the method more reliable. Indeed the relative alignment of the fingertips is slightly dependent on the person performing the gesture of the hand. Furthermore, it is possible to use different methods for determining the oriented line, thus allowing the system to choose the one that provides the best result or by computing a line from two or more of these different methods.

Then, the method further comprises identifying S40 the edge of the 3D object having the closest orientation with the oriented line. It is to be understood that each edge of the 3D object defines a line, and the closest orientation with the oriented line is determined by a comparison between the oriented line and each of (or at least a part of) the lines formed by the edges. Examples of determination of the closest orientation are now discussed.

As an example, the orientation of each edge may be materialized by a line. For each edge, the angle between the line representing its orientation and the oriented line formed with the folded fingers of the hand (except thumb) is computed. The edge having the smallest value angle is the edge of the 3D object having the closest orientation with the oriented line. Here we consider that all angles are defined between [0; 2PI].

In examples of the present disclosure, the identifying S40 may be done iteratively by considering each edge of the 3D object. It is to be understood that only a subset of edges of the 3D object may be used when determining the edge of the 3D object having the closest orientation with the oriented line. For instance, only the closest edges (e.g. according to an Euclidian distance) to the user's hand may be used.

Using the orientation to select an edge among edges of a 3D object accelerates the selection of the edge of interest. Using the orientation to an edge among edges of a 3D object also reduces the ambiguity of which face the user wants to select. Indeed, an accurate 3D object is a digitally modeled 3D object, which replicates a physical one with a very high precision. For example, an accurate 3D model will commonly have many small edges to replicate a rough surface and large edges to replicate a flat surface. In this case, adjacent edges of an accurate 3D object have a significant orientation difference. Therefore, by using the orientation to select an edge among edges of a 3D object, the method is especially useful if 3D objects have many small edges, which is the case for accurate 3D objects.

In examples, the identifying S40 may comprise identifying the edge of the 3D object having a closest direction between the direction of the edge and the direction of the oriented line. For example, the identifying S40 may be performed iteratively by considering each edge or a subset of edges of the 3D object. For each edge considered, the angle between its direction and the direction of the oriented line is computed. The edge having the smallest value angle is the edge of the 3D object having the closest direction to the oriented line. Here we consider that all angles are defined between [0; 2PI]. By using the direction instead of the orientation during the identifying S40, the ambiguity of which edge the user wants to select is even more reduced. Indeed, if two colinear edges have an opposite direction, using the direction instead of the orientation during the identifying S40 removes the ambiguity of which the user wants to select.

Figure 7:
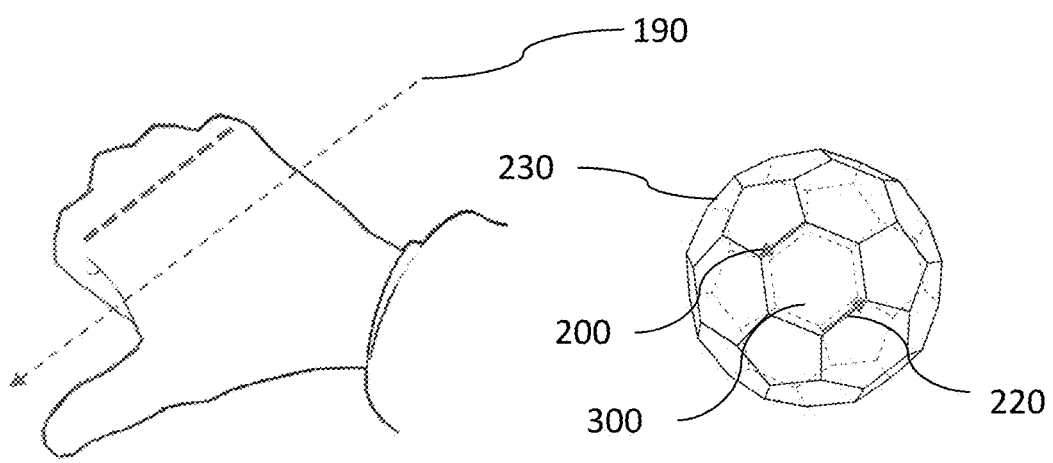
FIG. 7 shows an example of identification of an edge.

FIG. 7 illustrates a selection of an edge where the direction of the edge intervenes during the selection. Edges 200 and 220 belong to an hexagonal face 300. They have the same orientation (they are parallel) but with an opposite direction. In this example, the two edges 200 and 220 have an orientation that is identical to (or very close to) the orientation of the line 190. The line 190 derived S30 from the hand gesture S20 has the closest direction to the edge 200, and the edge 200 is identified.

Figure 8:
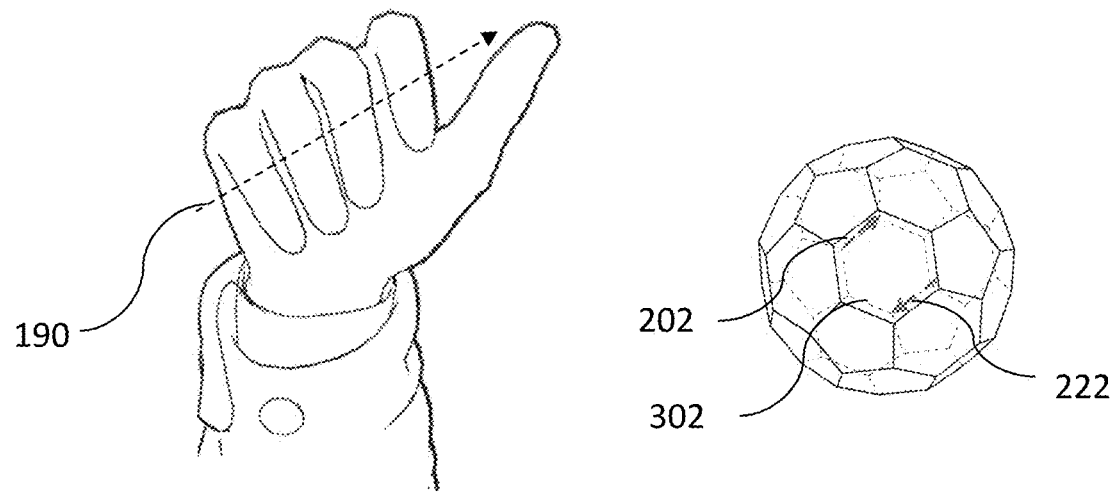
FIG. 8 shows another example of identification of an edge.

Referring now to FIG. 8, the selection of an edge according to the orientation and direction of the line (S30) is represented. The 3D object is the same as in FIG. 7, except that by turning the palm of their right hand towards their head, the method allows the user to select an edge 202 that belongs to a same face 302 but having a situated at the back of the object from the user's viewpoint. The edge 202 is selected and not the edge 222 as the edge 202 has the closest direction with the direction of the line 190.

Interestingly, using the direction to select an edge among edges of a 3D object is also particularly useful to select an edge having a small visible surface from the user's point of view. The user only needs to turn the palm of their right hand towards the 3D object to select the desired edge despite its small visibility.

In examples, the identifying S40 may comprise identifying the edge among edges, which minimizes a function noted $f$. This function will be discussed below. Before using the function (that is before performing the identifying S40), a plane formed with the palm or the back of the hand in the 3D immersive environment is determined. The plane may be oriented by a normal. Determining the plane is based on evaluating the orientation of the palm and/or the back of the hand. The palm and/or the back of the hand may be considered as a flat surface when all fingers except thumb are adducted or folded. Therefore, it is possible to consider the back of the hand as a plane when all fingers except thumb are adducted or folded. In order to approximate the orientation of the palm and/or the back of the hand when all fingers except thumb are adducted by using the normal of any points of the plane or by using the position of three points of the plane in order to compute the normal of the plane with a cross product. Still before using the function, the oriented line formed with the folded fingers has a direction and a position. Each edge of the 3D object and the oriented line further have a position in the 3D immersive environment; their position is computed as known in the art.

Figure 9:
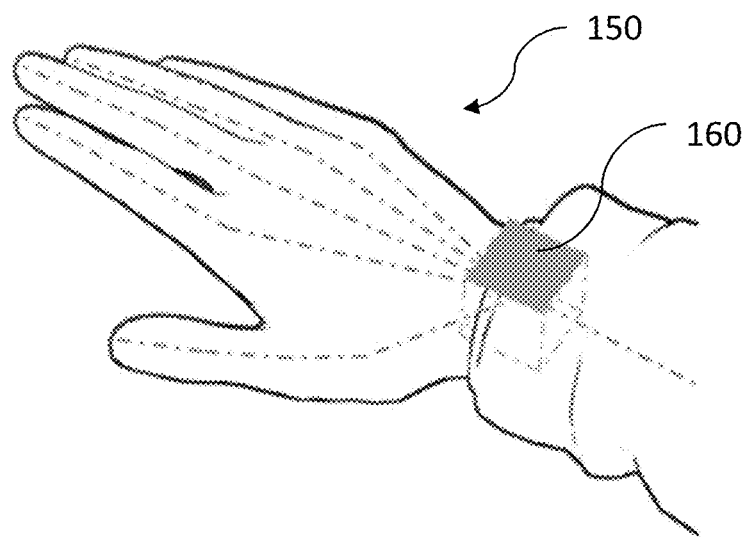
FIGS. 9 and 10 show an example of determination of an oriented plane formed with the palm or the back of the hand.

It is now discussed FIG. 9. FIG. 9 shows an example of the determining an oriented plane by using the orientation of the wrist joint 160 of the virtual skeleton. Indeed, the wrist joint 160 of the virtual skeleton 150 is a point of the oriented plane representing the palm and/or the back of the hand, therefore the orientation of the wrist joint 160 is the orientation of the orientated plane.

Figure 10:
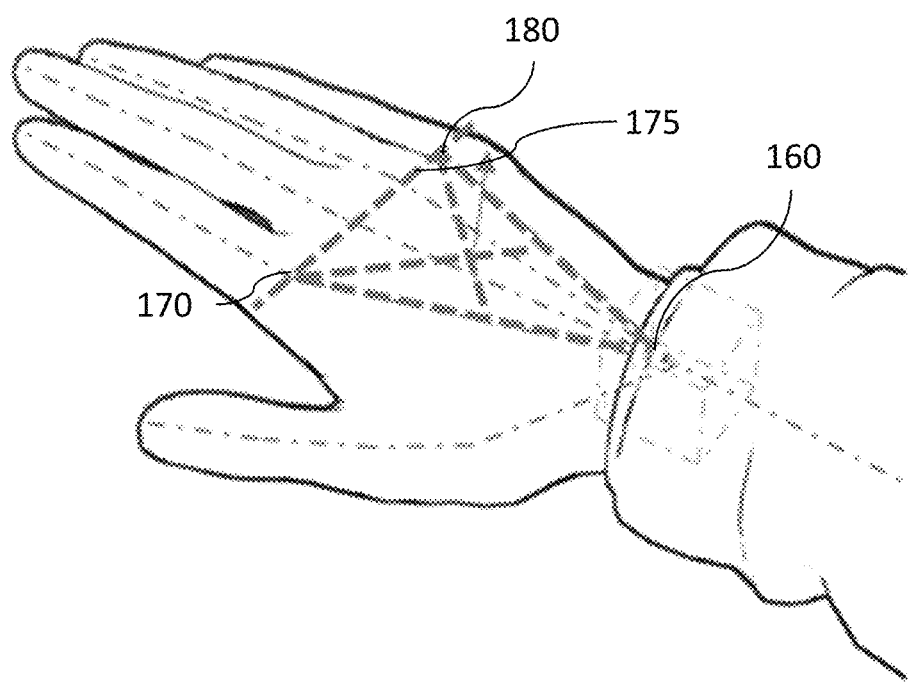

FIG. 10 shows another example of the determining S30 based on the position of the wrist joint 160, the position of the metacarpophalangeal joint 170 of index finger and the position of the metacarpophalangeal joint 180 of little finger. The three positions form a triangle. A normal of a triangle may be calculated by taking the vector cross product of two sides of that triangle. The normal gives the direction of the palm and/or the back of the hand, depending on the sides chosen to calculate the cross product. The normal depends also on the order these sides are used to calculate the cross product. The orientation of a triangle may be materialized by a line perpendicular to the plane on which all corners of the triangle are lying. The orientation of a triangle may also be edited and therefore not perpendicular to the plane.

The function noted $f$ is now discussed. This function is computed with the following equation (1):

$$f(\text{Edge}) = w_1 * \|FH\| + w_2 * \widehat{FH} \quad (1)$$

wherein:
Edge is the edge of interest;
$\{w_1 \in \mathbb{R} \mid w_1 \geq 0\}$ and $\{w_2 \in \mathbb{R} \mid w_2 \geq 0\}$ and $\{w_1 + w_2 > 0\}$;
$\|FH\|$ is an Euclidian distance in the 3D immersive environment between the position of the edge Edge and the position H of the oriented plane of the hand; and
$\widehat{FH}$ is an angle in the 3D immersive environment between the direction of the edge Edge and the direction of the orientated line formed by the folded fingers of the hand.

The function $f$ is a weighted sum of two terms. Indeed, the first term $\|FH\|$ is multiplied by a factor $w_1$ and the second term $\widehat{FH}$ is multiplied by a factor $w_2$.

The first weighted term $\|FH\|$ is the Euclidian distance in the 3D immersive environment between the position of the edge Edge and the position H of the oriented plane of the palm and/or the back of the hand. For example, the position of the edge Edge may be located at the centroid of the edge. The position of the oriented plane of the palm and/or the back of the hand may be, as an example, located at the position of the wrist joint 160 of the virtual skeleton.

The second weighted term $\widehat{FH}$ is the angle between the direction of the edge Edge and the direction of the orientated line formed by the folded fingers of the hand. The second weighted term could also be based on the orientation of the edge Edge and the orientation of the oriented line formed by the folded fingers of the hand instead of using their directions.

Each weight $w_1$ and $w_2$ may be equal or superior to 0. The sum of the two weights is strictly superior to 0. If one of the weight is equal to 0, it means only one of the two terms is considered in the function. As an example, $w_1$ may be set between 0.1 and 0.5 and $w_2$ may be set between 0.5 and 0.9.

The weights $w_1$ and $w_2$ may be precomputed. For example, they may be precomputed based on the number and the size of the edges of the 3D object. The weights $w_1$ and $w_2$ may, for example, be precomputed at the loading of the 3D immersive environment containing the 3D object. If the 3D object has many small edges, the weight of the second term might be larger than the weight of the first term. The weights may also depend of the devices used. For example, some devices might give a limited precision for the position of the hands but a better precision for the orientation. The weights may also vary during the method. For example, the weights may vary depending on the number and the size of the edges of the 3D object of the surfaces of the 3D object located in the field of view of the user. The field of view may be defined as the extent of the observable environment at a given time. Therefore, because the field of view might vary during the method, the weights $w_1$ and $w_2$ may also vary.

In an example, the identifying S40 may be done iteratively by considering each edge of the 3D object. In another example, the identifying S40 may be done iteratively by considering each edge of a subset of the 3D object. For each edge, the result of the function $f$ is computed. The edge having the smallest value is the face of the 3D object minimizing the function $f$.

In examples, the term $|FH|$ of the function $f$ may be replaced by the term $\|FH'\|$. H' is computed using the equation (2) by:

$$H' = E + EH * \max(1, a * (\|EO_{max}\|)/\|EH_{max}\|) \quad (2)$$

wherein:
H' is the computed position of the center of a virtual hand;
E is the position of the user's point of view;
H is the position of the center of the user's hand;
EH is a vector from E to H;
O max is the position of the furthest edge of the 3D object from E;
H max is the furthest position of the center of the user's hand from E in a transverse plane of the user's body;
$\{a \in \widehat{FH} \mid a \geq 1\}$;
$\|EO_{max}\|$ is the norm of the vector from E to O max; and
$\|EH_{max}\|$ is the norm of the vector from E to H max;
H' is the computed position of the oriented plane of a virtual hand. The virtual hand may be defined as the hand virtually located at least further than the user's hand from the user's point of view E in the 3D immersive environment. Using a virtual hand is useful in order to ensure the term $\|FH'\|$ is always pertinent regarding the distance of the faces from the user's point of view. The virtual hand may not be closer from the user's point of view E than the user's hand. The user's point of view E may be for example situated at the center of their head or at their dominant eye or the middle of their eyes. O max is the position of the furthest edge of the 3D object from the user's point of view E. As an example, the considered edge as the furthest edge of the 3D object from the user's point of view E may be determined at the beginning of the method, for example at the beginning of the detecting S20. As an example, the considered edge as the furthest edge of the 3D object from the user's point of view E may also be updated all along the method. Updating the considered edge as the furthest edge of the 3D object from the user's point of view E is especially useful if the user's point of view E and/or the 3D object moves during the method. In other words, as an example, O max may be determined during the detecting S20 and may be updated during all the method. H max is the furthest position of the oriented plane of the user's hand from the user's point of view E in a transverse plane of the user's body. Therefore H max is an indicator of whether or not an edge is selectable by using the method considering the edge's distance from the user's point of view E. H max is for example the position of the oriented plane of the user's hand when the user's arm is stretched out horizontally in front of them. H max may be precomputed for example during a calibration phase. H max may also be set by the user. a is used as a factor of $\|EO_{max}\|/\|EH_{max}\|$. a is for example set by the user before using the method. If a=1, it means the virtual hand will be further than the user's hand in the 3D immersive environment when the distance between the furthest face of the 3D object from the user's point of view E is greater than the furthest position of the oriented plane of the user's hand from the user's point of view E in a transverse plane of the user's body. Using a greater value than 1 for a will allow user to select the furthest edge of the 3D object from the user's point of view E without having to stretch entirely their arm. As an example, a value of a may be set between 1.5 and 2. For the sake of simplicity, we will consider below that a=1.

Using a virtual hand improves the user's interactions with 3D object (and more generally in the 3D environment). Examples of FIGS. 11 and 12 illustrate improvements in ergonomics with the use of the virtual hand.

Figure 11:
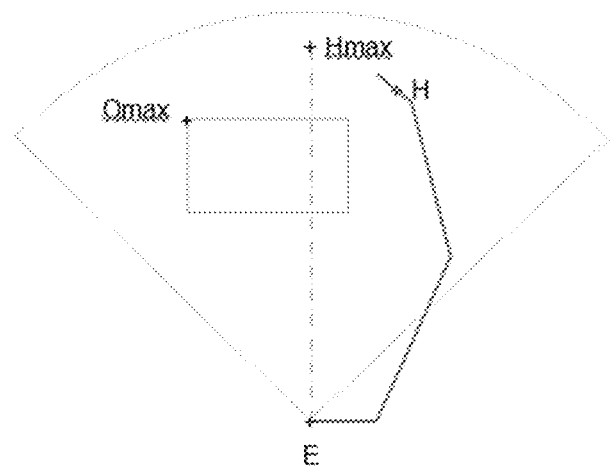
FIGS. 11 and 12 show examples of a virtual hand.

In the example of FIG. 11, using a virtual hand may allow a user to select any edge of the 3D object without having to stretch entirely their arm. Maintaining an arm stretch may be tiring for the user, therefore using a virtual solves this problem.

Figure 12:
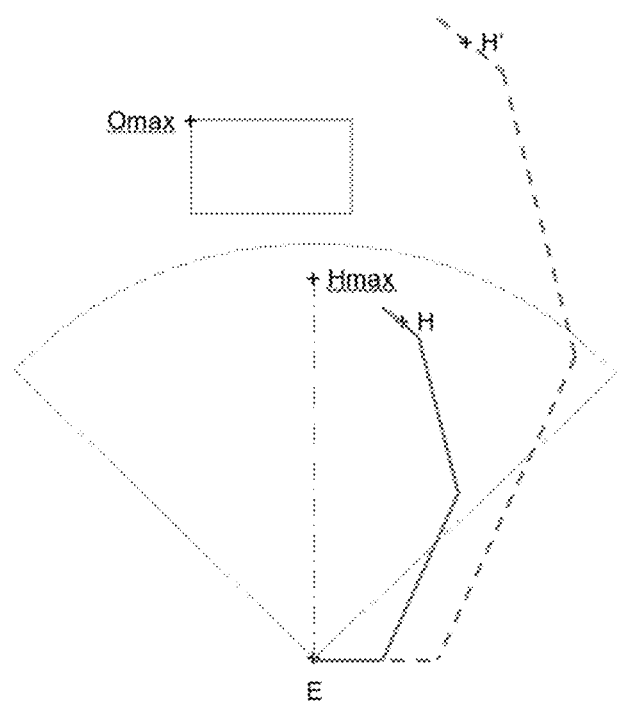

In the example of FIG. 12, using a virtual hand allows the user to select any edge of the 3D object without moving the user's point of view E. Indeed, as an example, when the distance between the furthest edge of the 3D object and the user's point of view E is greater than the distance between the furthest position of the center of the user's hand from E in a transverse plane of the user's body, some edges of the 3D object may not be selectable without using a virtual hand. In this case, the virtual hand is positioned further from the user's point of view E than the user's hand. Without using the virtual hand, the term $\|FH\|$ would penalize the selection of the furthest edge of the 3D object from the user's point of view E. The method would therefore be biased by this term. The virtual hand solves this problem by virtually moving the position of the user's hand in the 3D immersive environment in order to ensure the virtual H' may always be at least as far as the furthest edge of the 3D object with both positions considered from the user's point of view E.

In an example, using the virtual hand may be combined with a ray cast sent from the virtual hand. This combination may be activated for example if the user's hand is really close to the user's head. The direction of the ray may be orthogonal to the oriented plane or from the center of the palm/back of the virtual hand toward the center of the 3D object. This combination may be, for example really useful in Mixed or Augmented Reality to select any edge of a 3D object which may be surrounded by real obstacles.

In examples, the term $\|FH\|$ or the term $\|FH'\|$ of the function $f$ (respectively computed with equation (1) or equation (2)) may further comprise the Euclidean distance in the 3D immersive environment between the position of the edge and at least one intersection of the 3D model with a ray being cast from the user's point of view E. The ray may be cast for example from the center of the head or the dominant eye or the point between the eyes to the center of the 3D model. The direction of the cast may be for example defined by the direction of the user's gaze or user's head. The direction of the cast may also be for example computed from the position of the user's point of view E to the position of the center of the 3D model. The center of the 3D model may be for example defined as the center of the bounding box of the 3D model. As an example, the direction of the cast is calculated from the position of the user's point of view E to the position of the center of the 3D model.

Adding a term based on the Euclidean distance in the 3D immersive environment between the position of the edge and at least one intersection of the 3D model with a ray being cast from the user's point of view E to the term $\|FH\|$ or $\|FH'\lambda$ allows the method to be sensitive to the position of the user's point of view E. In other words, this allows to promote the selection of an edge aligned with the line between the user's point of view E and the at least one intersection of the 3D model with the ray. This is especially useful if the 3D model is partially rendered outside the field of view. In this case, the method will penalize selection of edge outside the field of view.

In order to retrieve the position and/or orientation of the user's head, a head tracking may be done by any technology able to detect a change of posture or a motion. As an example, there are headsets or glasses providing such information in Virtual, Mixed or Augmented reality. In order to retrieve the direction and/or orientation of the user's gaze, eyes tracking technology may be used.

Figure 2:
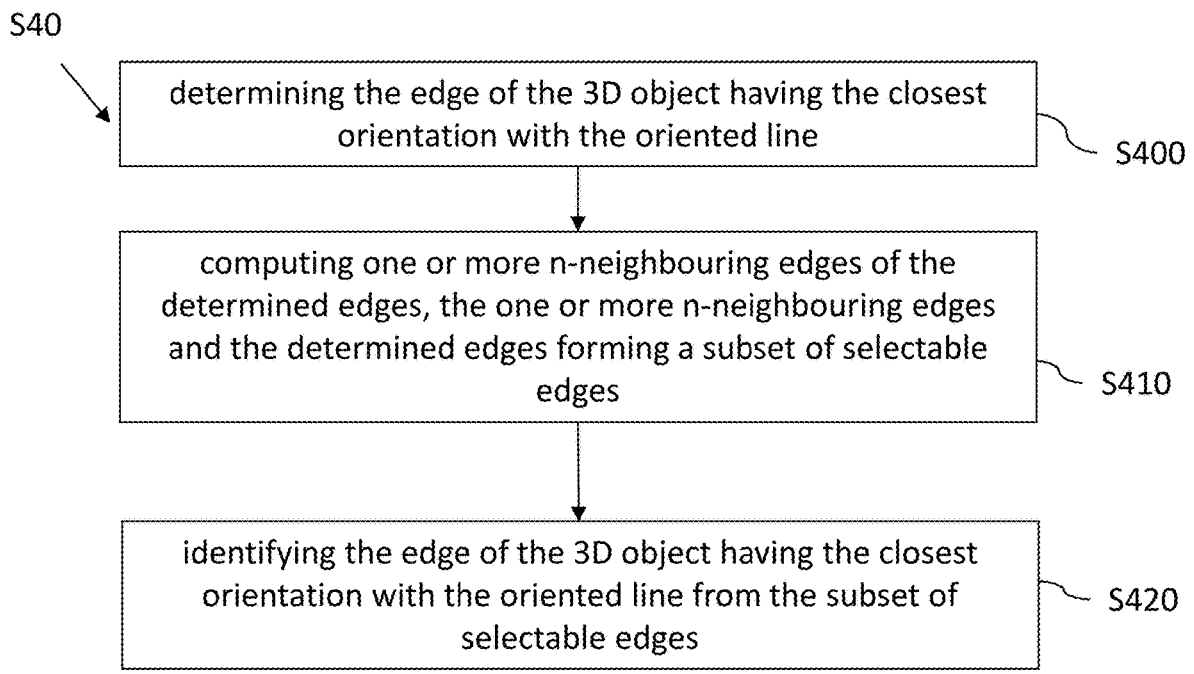
FIG. 2 shows an example of a flowchart of step S40 of the method.

In examples, with reference to the example of FIG. 2, the identifying S40 may further comprise determining S400 the edge of the 3D object having the closest orientation with the oriented line. The identifying S40 may further comprise computing S410 one or more n-neighboring faces of the determined edge, the one or more neighbor edges and the determined edge forming a subset of selectable edges. A n-neighboring edge of a determined edge is an edge sharing one vertex with a n−1 neighboring edge of the determined edge and not sharing a vertex with the n−2 neighboring edge. Therefore, a 1-neighbouring edge of a determined edge is an edge sharing a vertex with the determined edge and a 2-neighbouring edge of a determined edge is an edge sharing a vertex with a 1-neighbouring edge of the determined edge and not sharing an edge with the determined edge. The identifying S40 further comprises identifying S420 the edge of the 3D object having the closest orientation with the oriented line from the subset of selectable edges. n may be predetermined based on the size of the edges of the 3D objects. n may also be updated based on the size of the edge forming the subset or on the size of the visible surface from the user's point of view E of the edges forming the subset and/or on the distance between the point of view of the user and the determined edge. n may be also predetermined based on the devices specifications or based on the user preferences.

The determining S400 and S420 may also be performed by determining the edge of the 3D object having the closest direction or by determining the face minimizing the function $f$ of equations (1) or (2). All combinations between the determining S400 and S420 may be used. For example, the determining S400 may be done by determining the edge of the 3D object having the closest direction and the determining S420 may be done by determining the edge minimizing the function $f$.

In another example, the determining S400 and the determining S420 may be done by determining the edge minimizing the function $f$. In this case, during the determining S400, the weight $w_1$ may be four times greater than $w_2$ and during the determining S420 the weight $w_1$ may be four times smaller than $w_2$.

In examples, the method may further comprise modifying a first rendering of the edges of subset of selectable edges. The subset of selectable edges is computed during the step S410. As explained above, the subset is, for example, computed based on the determined edge during the determining S40. The size of the subset depends of the value of n used in the computing S410. In an example, the value of n may be computed to ensure the visible surface from the point of view of the user is always large enough for the user to easily identify it. Modifying the rendering of the subset helps the user to identify which edges will be considered as selectable during the step S420. Therefore, if, the user will easily identify that the edge of interest is not amongst this subset and therefore modify their hand's position and/or orientation to change the subset during the step S410.

The rendering of an edge of the 3D object is not modified by the method when the detecting S20 does not happen.

In an example, the user, after identifying the subset of selectable edges, may modify their hand's position in order to change the subset of selectable edges and/or they may modify their hand's orientation in order to change the identified edge among the same subset of selectable edges.

The modification of the rendering may be done in various ways. The modification of the rendering may be done during the computing S410 and/or identifying S420. As an example, the modification of the rendering may be performed by highlighting the selectable edges. As another example, the modification of the rendering may be performed by applying a specific texture to the selectable edges. In another example, the modification of the rendering may also comprise a zoom-in and a disconnection of the selectable edges from the 3D object. The modification of the rendering may be completed by any another feedback to the user such as the automatic snapping of a graphical user information on the identified edge. The modification of the rendering may also appear on top of the hands of the user by changing their representation. For example, the color of the hands could change, or lines may be overlaid on top of the fingers.

In examples, the method may further comprise modifying a second rendering of the identified edge. The identified edge may be, for example, the edge identified during the step S40. Therefore, the modification of rendering of the identified edge starts and helps the user to select the edge of interest.

The identified edge may also be, for example, the edge identified during the step S420. The identified edge may also be, for example, the edge determined during the step S400. In these cases, for example, a second and a third rendering might be different than the first rendering of the subset of selectable edges. The second rendering might also be different than the third rendering. The first and/or the second and/or the third renderings improve user interactions with the 3D object in the 3D environment: indeed, the user may more easily grasp during step S420 if they need to change their hand's position in order to change the subset of selectable edges and/or they may modify their hand's orientation in order to change the identified edge among the same subset of selectable edges. Less user interactions are required in order to select the desired edge.

A good balance may be found between providing continuous user feedback and avoiding excessive popping. Providing continuous user feedback may be defined as having the method responsive to the user's input. In other words, for example, as soon as the user provides an input, the method should update with no visible delay, the result of the identifying S40 and/or the result of the determining S400 and/or the result of the computing S410 and/or the result of the identifying S420. By having the method responsive to the user's input, there is a risk that the method provides excessive popping. This term defines the tendency of a user interface to switch promptly and continuously between various states. In the method, it may be for example a prompt and quick switch between two or more faces considered as the identified face.

As an example, the identified edge with a modified rendering may be kept until a better candidate of the same dimension has been confidently identified. In other words, the identifying S40 may comprise minimizing the function $f$, the switching from a current identified edge to another edge will not be done as soon as the value of the function $f$ for the other edge is smaller than the value of the function $f$ for the current identified edge. To avoid excessive popping, a penalizing threshold or a penalizing factor may be used during the identifying S40 for the comparison of the value of the result of the function $f$ of the current identified edge to another edge. In other words, the identified edge with a modified rendering may be kept until a better candidate of the same dimension is minimizing the function $f$, with an added penalizing threshold and/or multiplied by a penalizing factor to the result of the function $f$ of the candidate. Alternatively, excessive popping may be avoided by switching from a current identified edge to another edge only after detecting that the user's hand is not moving for a certain amount of time.

The continuous user feedback may be done, for example, by a modification of the rendering of the 3D object and/or by adding virtual representations near the 3D object and/or near the hands user and/or by haptic feedback from the devices.

In examples, an edge of the 3D objects in the method may be an edge forming part of a triangle and/or a quadrangle and/or a topological face. A topological face is a group of neighboring triangles or a group of neighboring quadrangles, which form a larger "logical" continuous face while still potentially displaying a wide variety of orientation between each primitive, especially when the topological face is large. In a CAD program, a topological face is most of the time bounded by topological edges. By neighboring triangles and/or neighboring quadrangles, it is to be understood that each triangle or quadrangle of the group is a 1-neighbouring triangle or quadrangle of a triangle or quadrangle of the said group. For example, a CAD object representing a car may be composed of few thousands triangles which may be grouped in less than one hundred topological faces. For example, one topological face may represent the superior surface of the seat of the car.

In examples, the detecting S20 of the hand gesture comprises a folding of all fingers except thumb and an abduction of the thumb. As shown in FIG. 5, the index finger, middle finger, ring finger and little finger are folded, while the user performs an abduction of the thumb. The abduction of the thumb is the result of a contraction of muscles including the abductor pollicis brevis muscle.

Detecting a folding of all fingers except thumb and an abduction of the thumb is advantageous for two reasons. First, this gesture is very easy to be carried out by the user, thus improving ergonomics of the gesture. In addition, this gesture reduces the risk of confusion between the detected posture and the default posture, therefore the detecting S20 is more reliable.

In examples, the method further comprises selecting the identified edge of the 3D object by detecting that the hand gesture further comprises an adduction of the thumb. In other words, the identified edge of the 3D object is added to the current selection of edges when the hand gesture further comprises an adduction of the thumb. The identified edge is therefore considered as a selected edge. This selection may happen during step S40 or S400 or S420. The user may therefore use the method iteratively to select multiple edges of interest.

In examples, the method may further comprises detecting that the hand gesture further comprises an unfolding of all fingers except thumb and deselecting the selected edge. The detection may happen during any step of the method. As an example, the user may therefore deselect the last selected edge. As another example, the user may deselect their entire current selection of edges.

In examples, the detecting of the hand gesture may further comprise detecting that the distal phalanges are substantially in contact with the palm of the hand. The contact of distal phalanges with the palm improves robustness of the detecting S20. Detecting that the distal phalanges are substantially in contact with the palm of the hand reduces the risk of confusion between the detected posture and the default posture.

The invention claimed is:

1. A computer-implemented method for selecting an edge among edges of a 3D object in a 3D immersive environment of a CAD system, each edge being oriented in the 3D immersive environment, comprising:
displaying the 3D object in the 3D immersive environment;
detecting, by a processor, a hand gesture including all fingers of a hand folded except thumb;
determining, by the processor, an oriented line formed with the folded fingers of the hand, except thumb, in the 3D immersive environment; and
identifying, by the processor, the edge of the 3D object having a closest orientation with the determined oriented line.

2. The computer-implemented method of claim 1, wherein each edge of the 3D object and the oriented line further have a direction, and
wherein the identifying further comprises identifying a face edge of the 3D object having a closest direction between the direction of said edge and the direction of the oriented line.

3. The computer-implemented method of claim 2, further comprising:
before the identifying, determining an oriented plane formed with a palm or a back of the hand in the 3D immersive environment, the oriented plane including a normal,
wherein each edge of the 3D object and the oriented line further have a position in the 3D immersive environment, and wherein the identifying further comprises:
minimizing a function $f$:

$$f(\text{Edge}) = w1 * \|FH\| + w2 * \widehat{FH}$$

wherein:
Edge is an edge of interest;
$\{w1 \in \mathbb{R} \mid w1 \geq 0\}$ and $\{w2 \in \mathbb{R} \mid w2 \geq 0\}$ and $\{w1+w2>0\}$;
$\|FH\|$ is an Euclidian distance in the 3D immersive environment between the position of the edge Edge and a position H of the oriented plane of the hand; and
$\widehat{FH}$ is an angle in the 3D immersive environment between the direction of the edge Edge and direction of the oriented line formed with the folded fingers of the hand.

4. The computer-implemented method of claim 3, wherein the term $\|FH\|$ of the function $f$ is replaced by $\|FH'\|$ with H' being computed by:

$$H' = E + EH * \max(1, a*(\|EO\ \max\|)/\|EH\ \max\|)$$

wherein:
H' is the position of the oriented plane of a virtual hand;
E is the position of the user's point of view;
His the position of the oriented plane of the user's hand;
EH is a vector from E to H;
O max is the position of the furthest edge of the 3D object from E;
H max is the furthest position of the center of the user's hand from E in a transverse plane of the user's body;
$\{a \in \mathbb{R}^*\}$;
$\|EO\ \max\|$ is the norm of the vector from E to O max; and
$\|EH\ \max\|$ is the norm of the vector from E to H max.

5. The computer-implemented method of claim 4, wherein the term $\|FH\|$ of the function $f$ further includes the Euclidean distance in the 3D immersive environment between the position of the edge and at least one intersection of the 3D model with a ray being cast from the center of the head or the dominant eye or the point between the eyes to the center of the 3D model.

6. The computer-implemented method of claim 1, wherein the identifying further comprises:
determining the edge of the 3D object having a closest orientation with the oriented line;
computing one or more n-neighboring edges of the determined edge, the one or more n-neighboring edges and the determined edge forming a subset of selectable edges; and
identifying the edge of the 3D object having a closest orientation with the oriented line from the subset of selectable edges.

7. The computer-implemented method of claim 6, further comprising modifying a first rendering of the edges of the subset of selectable edges.

8. The computer-implemented method of claim 1, further comprising modifying a second rendering of the identified edge.

9. The computer-implemented method of claim 1, wherein the edge of the 3D object is an edge that is part of at least one selected from among triangles and/or quadrangles and/or topological faces and/or parametric surfaces and/or procedural surfaces.

10. The computer-implemented method of claim 1, wherein detecting the hand gesture further comprises detecting a folding of all fingers except thumb and an abduction of the thumb.

11. The computer-implemented method of claim 1, further comprising:
selecting the identified edge of the 3D object by detecting that the hand gesture further comprises an adduction of the thumb.

12. The computer-implemented method of claim 11, further comprising:
detecting that the hand gesture further includes an unfolding of all fingers except thumb; and
deselecting the selected edge.

13. The computer-implemented method of claim 1, wherein detecting the hand gesture further comprises:
detecting that distal phalanges of index finger, middle finger, ring finger and little finger are substantially in contact with a palm of the hand.

14. A non-transitory data storage medium having recorded thereon a computer program including instructions that when executed by a computer causes the computer to perform a method for selecting an edge among edges of a 3D object in a 3D immersive environment of a CAD system, each edge being oriented in the 3D immersive environment, the method comprising:
  displaying the 3D object in the 3D immersive environment;
  detecting a hand gesture including all fingers of a hand folded except thumb;
  determining an oriented line formed with the folded fingers of the hand, except thumb, in the 3D immersive environment; and
  identifying the edge of the 3D object having a closest orientation with the determined oriented line.

15. The non-transitory data storage medium of claim 14, wherein each edge of the 3D object and the oriented line further have a direction, and
  wherein the identifying further comprises identifying a face edge of the 3D object having a closest direction between the direction of said edge and the direction of the oriented line.

16. The non-transitory data storage medium of claim 15, further comprising:
  before the identifying, determining an oriented plane formed with a palm or a back of the hand in the 3D immersive environment, the oriented plane including a normal,
  wherein each edge of the 3D object and the oriented line further have a position in the 3D immersive environment, and wherein the identifying further comprises:
  minimizing a function $f$:

$$f(Edge) = w1 * \|FH\| + w2 * \widehat{FH}$$

wherein:
Edge is an edge of interest;
$\{w1 \in \mathbb{R} \mid w1 \geq 0\}$ and $\{w2 \in \mathbb{R} \mid w2 \geq 0\}$ and $\{w1+w2>0\}$;
$\|FH\|$ is an Euclidian distance in the 3D immersive environment between the position of the edge Edge and a position H of the oriented plane of the hand; and
$\widehat{FH}$ is an angle in the 3D immersive environment between the direction of the edge Edge and direction of the oriented line formed with the folded fingers of the hand.

17. The non-transitory data storage medium of claim 16, wherein the term $\|FH\|$ of the function $f$ is replaced by $\|FH'\|$ with H' being computed by:

$$H' = E + EH * \max(1, a*(\|EO\ max\|)/\|EH\ max\|)$$

wherein:
H' is the position of the oriented plane of a virtual hand;
E is the position of the user's point of view;
H is the position of the oriented plane of the user's hand;
EH is a vector from E to H;
O max is the position of the furthest edge of the 3D object from E;
H max is the furthest position of the center of the user's hand from E in a transverse plane of the user's body;
$\{a \in \mathbb{R}^*\}$;
$\|EO\ max\|$ is the norm of the vector from E to O max; and
$\|EH\ max\|$ is the norm of the vector from E to H max.

18. The non-transitory data storage medium of claim 17, wherein the term $\|FH\|$ of the function $f$ further includes the Euclidean distance in the 3D immersive environment between the position of the edge and at least one intersection of the 3D model with a ray being cast from the center of the head or the dominant eye or the point between the eyes to the center of the 3D model.

19. The non-transitory data storage medium of claim 14, wherein the identifying further comprises:
  determining the edge of the 3D object having a closest orientation with the oriented line;
  computing one or more n-neighboring edges of the determined edge, the one or more n-neighboring edges and the determined edge forming a subset of selectable edges; and
  identifying the edge of the 3D object having a closest orientation with the oriented line from the subset of selectable edges.

20. A system comprising:
a display; and
a processing circuitry communicatively coupled with a memory, the memory storing a computer program for selecting an edge among edges of a 3D object in a 3D immersive environment of a CAD system, each edge being oriented in the 3D immersive environment, that when executed by the processing circuitry causes the processing circuitry to be configured to:
display the 3D object in the 3D immersive environment,
detect a hand gesture including all fingers of a hand folded except thumb,
determine an oriented line formed with the folded fingers of the hand, except thumb, in the 3D immersive environment, and
identify the edge of the 3D object having a closest orientation with the determined oriented line.

* * * * *